Figure 1:
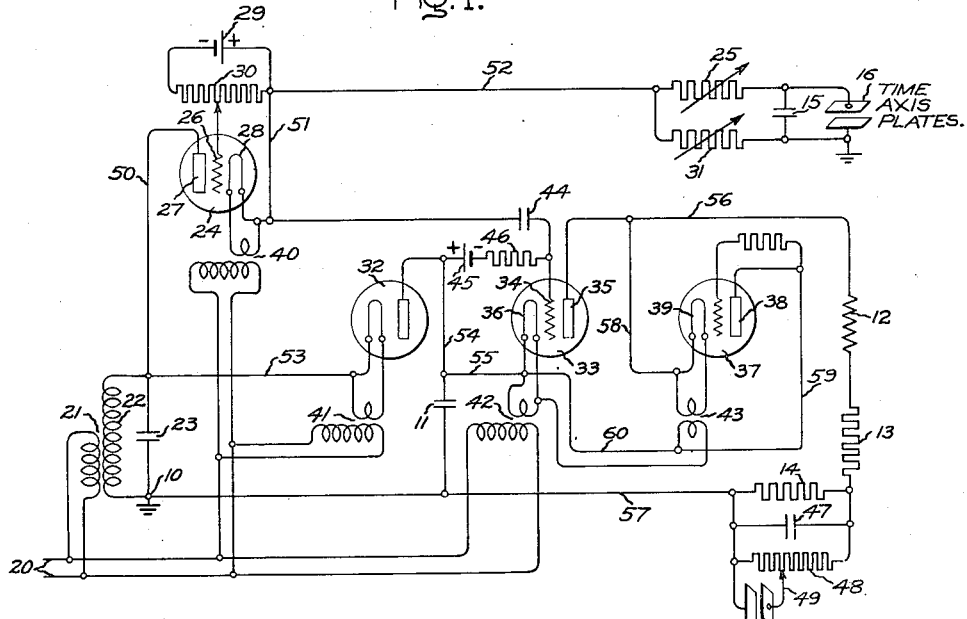

Sept. 28, 1937.   N. ROHATS   2,094,472
GRAPHICAL ANALYZER
Filed May 10, 1935   2 Sheets-Sheet 1

Inventor:
Nicholas Rohats,
by Harry E. Dunham
His Attorney.

Sept. 28, 1937.  N. ROHATS  2,094,472
GRAPHICAL ANALYZER
Filed May 10, 1935  2 Sheets-Sheet 2

Inventor:
Nicholas Rohats.
by Harry E. Dunham
His Attorney.

Patented Sept. 28, 1937

2,094,472

UNITED STATES PATENT OFFICE 2,094,472

GRAPHICAL ANALYZER

Nicholas Rohats, Scotia, N. Y., assignor to General Electric Company, a corporation of New York Application May 10, 1935, Serial No. 20,731

13 Claims. (Cl. 175—183)

My invention relates to graphical electrical instruments and concerns particularly transient analyzers and impulse testers.

My invention has for its principal object the provision of a self-contained surge generator and transient analyzer.

One of the objects of my invention is to provide means for applying repeated surges or impulses to a circuit to be tested, the surges being synchronized with the timing motion of the beam of an oscillograph for the purpose of retracing the curve and producing a brilliant image of the transient wave shape.

Another object of my invention is to provide a circuit-testing apparatus which may employ a low-voltage low-current surge generator to operate a low or medium-voltage hot-cathode continuous-beam cathode ray oscillograph.

Another object of my invention is to provide relatively inexpensive compact apparatus for quickly and easily testing electrical circuits under transient conditions, analyzing transients, and producing transients of predetermined characteristics.

Still another object of my invention is to provide apparatus with easily adjusted circuits for producing surges of any desired wave shape.

It is also an object of my invention to provide apparatus in which the wave shape analyzed is continuously visible and the effects of changes in its generating circuit are instantly apparent.

Still another object of my invention is to provide apparatus for determining graphically the impulse generator circuit constants required for any desired wave shape and load.

Still another object of my invention is to provide apparatus for the graphical analysis of the surge mechanism of electrical apparatus and for the demonstration of transient phenomena.

Other and further objects and advantages will become apparent as the description proceeds.

Knowledge of the voltage and current characteristics of electrical apparatus is of importance to an engineer in aiding him to produce successful designs. In order to test electrical apparatus under transient conditions and for the purpose of studying the nature of transient currents, surge generators have been built which consist of capacitors for storing up energy, a suitable surge discharge circuit, and sphere gaps for initiating or controlling the surge. Such apparatus, however, is inherently high-voltage apparatus and is relatively expensive, bulky, not well adapted for construction as portable equipment, requires elaborate safeguards for the protection of operators, requires the use of high-voltage oscillographs, and is difficult to use in performing controlled tests on electrical apparatus. Furthermore, such high-voltage apparatus could not be used for testing the transient characteristics of apparatus not built to withstand high voltage.

In order to overcome these objections in carrying out my invention in its preferred form, I provide apparatus which is adapted to apply repeated low-voltage low-current surges to electrical apparatus or to an electrical circuit to be examined, and I also provide a graphical instrument, such as a cathode ray oscillograph, and a timing circuit interlocked with that of the surge-generating apparatus in order that the records of successive surges will be superimposed to produce a brilliant standing image. In order to facilitate timing the surges produced, I employ discharge tubes having control electrodes.

Figure 2:
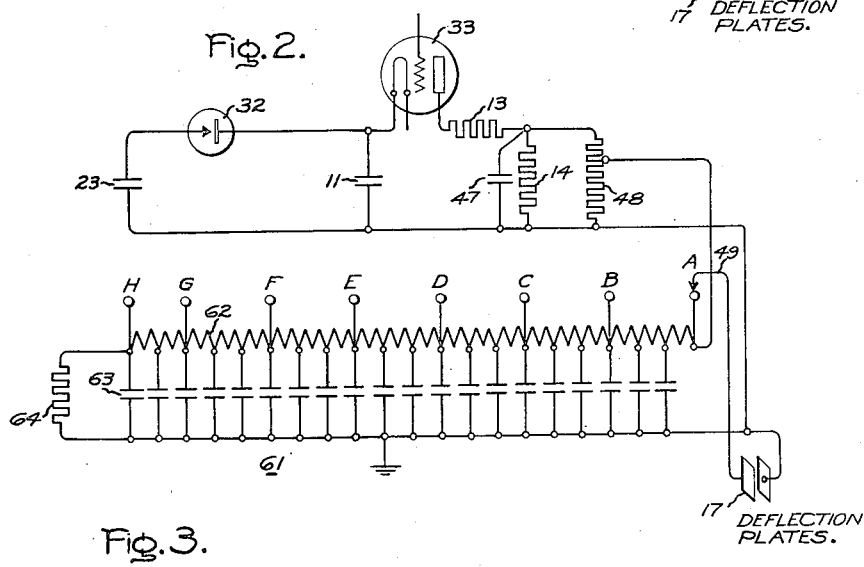
Figure 3:
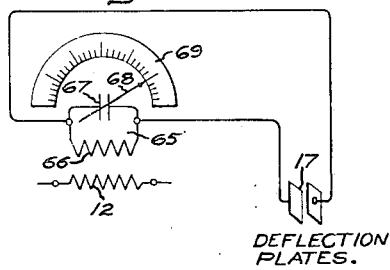

The features of my invention which are believed to be novel and patentable will be pointed out in the claims appended hereto. A better understanding of my invention may be obtained by referring to the following description taken in connection with the accompanying drawings in which Fig. 1 is a schematic circuit diagram of one embodiment of my invention; Fig. 2 is a schematic diagram of an illustrative electrical circuit to be tested together with a portion of the apparatus of Fig. 1; Fig. 3 is a schematic circuit diagram of the apparatus employed for calibrating the timing axis of the oscillograph used in my apparatus; and Figs. 4 to 10 are graphs illustrating the operation of my apparatus and the manner in which analyses of transient waves and the characteristics of impedances are obtained.

In the drawings, like reference characters are utilized to designate like parts throughout. In Fig. 1, I have shown a surge capacitor 11 with a surge discharge circuit including the inductance 12 and resistors 13 and 14. A suitable oscillograph is provided for observing the magnitude of the surge. A timing circuit including suitable resistors and a condenser 15 is also provided for timing the action of the apparatus.

Any suitable type of oscillograph may be employed but, owing to the high speed with which transient phenomena take place, I prefer to employ relatively inertialess devices, such as cathode ray oscillographs or oscilloscopes, electron beam oscillographs, and other devices of a similar character having a deflecting beam co-operating with a fluorescent screen. Since such oscillographs are well known, I have not illustrated the entire oscillograph in the drawings and I have shown only two elements thereof, 16 and 17, representing the means for causing the beam to traverse the screen along the two transverse axes in the customary manner. While I may use oscillographs of either the electrostatic or the electromagnetic beam deflecting type or a combination thereof, I shall refer by way of illustration to the use of an oscillograph having two pairs of electrostatic plates 16 and 17 at right angles to each other for controlling perpendicular axes, such as the oscillographs shown in United States Patent No. 1,695,719 to Rüdenberg or No. 1,768,262 to Marrison.

The plates 16, which are associated with the timing axis, are connected to the condenser 15 and the plates 17, which are associated with the deflection or measuring axis, are connected to the discharge circuit of the surge capacitor 11 in a suitable manner depending upon the quantity to be measured. The arrangement is such that the condenser 15 is charged and discharged periodically to vary the voltages on the time axis plates 16 and to move the beam back and forth along the timing axis. The surge capacitor 11 is arranged to be discharged each time the oscillograph beam starts in a forward direction along the timing axis.

The power for operating the apparatus is supplied from a source of alternating current 20 through a step-up transformer 21 having a secondary winding 22. A supply condenser 23 is connected across the secondary winding 22. One terminal 10 of the condenser 23 and one of the timing axis plates 16 is grounded. A discharge tube 24 is provided for controlling the charging of the timing circuit condenser 15 from the supply transformer winding 22. Preferably, a variable resistor 25 is connected in series with the charging circuit to fix the magnitude of the charging current and the rate of travel of the oscillograph beam.

The tube 24 is preferably of the type having a control electrode 26 as well as an anode 27 and a cathode 28. The tube 24 may be of the gas or vapor filled type in which the flow of current continues after it has been initiated as long as sufficient voltage exists between the anode 27 and the cathode 28. Preferably, an adjustable source of voltage comprising, for instance the cell 29 and the potentiometer 30 is provided for biasing the control electrode 26 to a predetermined voltage with respect to the cathode 28. The exact biasing potential to be employed depends upon the characteristics of the tube 24 but is so chosen that the tube 24 will remain nonconducting until the voltage of the secondary winding 22 during the positive half cycle reaches approximately its peak value. In this manner, the timing-circuit condenser 15 is charged once for every cycle of the alternating current supplied by the source 20.

The charging of the condenser 15 causes the beam of the cathode ray oscillograph to be moved to one end of its travel along the timing axis by virtue of the electrostatic field produced between the timing axis plates 16. In order to bring the beam back to its starting point, an adjustable discharge resistor 31 of relatively high resistance is connected to one end of the resistor 25 and one of the plates of the condenser 15.

The surge capacitor 11 is connected to the supply transformer winding 22 through a rectifier 32 which may, if desired, be of the discharge tube type. The connections are such that current flows from the winding 22 to the condenser 11 only when the ungrounded terminal of the winding 22 is negative. A valve 33 is interposed in the discharge circuit of the surge capacitor 11 in series with the impedances 12, 13, and 14. The valve 33 may conveniently be a tube of the gas or vapor filled type having a control grid 34. Such a tube is provided also with an anode 35 and a cathode 36.

When the apparatus is to be used in connection with discharge circuits in which the discharge may be oscillatory, an additional valve 37 with an anode 38 and a cathode 39 connected oppositely with respect to the electrodes of the tube 33 may be provided to permit the reverse loop of the surge to flow.

Insulating step-down transformers 40, 41, and 42, energized by the source 20 may, if desired, be provided for heating the cathodes of the tubes 24, 32, and 33. Another insulating transformer 43, energized by the secondary winding of the transformer 42 may be provided for heating the cathode of the tube 37.

In order to cause the valve 33 to be tripped by its control electrode 34 in synchronism with the sweeping of the cathode ray beam along its timing axis, a locking or coupling condenser 44 is provided which is connected between control grid 34 of the tube 33 and the cathode 28 of the timing circuit-controlling tube 24. Preferably, a source of potential 45 is connected between the cathode 36 and the control electrode 34 of the tube 33 in order to bias the control electrode 34 negatively and prevent tripping of the tube 33 until a positive potential impulse is applied through the condenser 44. A resistor 46 may be connected in the control electrode circuit to allow the tripping impulse to raise the potential of the control electrode 34 to the trip point.

A condenser 47 may also be connected in the discharge circuit of the surge capacitor 11, for example, across the resistor 14. Although the deflection plates 17 may be connected directly between the points in the discharge circuit at which voltage is to be determined, it is convenient to provide a potentiometer or voltage divider 48 with a variable tap 49 to permit adjusting the magnitude of the voltage applied to the deflection plates 17. In Fig. 1, the voltage divider 48 is shown connected across the condenser 47.

My electrical transient graphical analyzer may be employed for various purposes but, for the sake of explanation, I shall refer to three general lines of work which may be accomplished:

(a) The graphical determination of impulse generator circuit constants for any required wave and load.

(b) Graphical analyses of surge mechanism of electrical apparatus.

(c) Demonstration of transient phenomena in the lecture room.

Fig. 1 illustrates one arrangement of elements for determining the circuit constants of an impulse generator circuit. By varying the constants of the condensers 11 and 47, the inductance 12, and the resistors 13 and 14, a great variety of waves may be impressed on the deflection plates 17.

The fundamental operation of the apparatus is substantially the same, however, regardless of the manner in which it is used. When the voltage impressed upon the anode 27 of the tube 24 by the secondary winding 22 reaches a predetermined positive value, regarding the grounded side 10 of the winding 22 as zero potential, the discharge tube 24 becomes conducting and a circuit is formed through the conductor 50, the tube 24, the conductors 51 and 52, the resistor 25, and the timing condenser 15 back to ground. As the condenser 15 is being charged, its potential rises and causes the beam of the cathode ray oscillograph to be deflected in the forward direction along the timing axis. Simultaneously with the initiation of the motion of the timing beam, the valve 33 is tripped owing to the fact that the flow of current through the resistor 25 causes the potential of the cathode 28 of the tube 24 to rise, carrying up with it the potential of the control grid 34 of the valve 33. Thereupon, a discharge of the surge capacitor 11 takes place.

It will be apparent that the surge capacitor 11 is charged during negative half cycles through the circuit formed through the rectifier 32 and the conductor 53 connected to the ungrounded side of the secondary winding 22. When the condenser 11 is discharged by the tripping of the valve 33, a discharge circuit is formed through the conductor 55, the valve 33, the conductor 56, the inductance 12, the resistance 13, the resistance 14, and the conductor 57, back to the grounded side of the surge capacitor 11.

If there is inductance present in the circuit, such as the inductance 12, and the resistance of the resistors 13 and 14 is below the critical damping value of the circuit, oscillations will tend to take place. In case the tube 37 is provided to take care of oscillatory discharges, a path for the reverse current loops will be provided through the conductor 57, the resistors 14 and 13, the inductance 12, the conductors 56 and 58, the tube 37, and the conductors 59, 60, and 55, back to the ungrounded side of the condenser 11.

As the voltage of the winding 22 dies away, the condenser 15 will discharge through the resistors 31 and 25 and the cathode ray beam will be brought back to its starting point along the timing axis. Preferably, the resistance of the resistor 31 is so great that the beam returns slowly and draws a zero line representing the timing axis. In this case, the timing circuit is so adjusted that the transient to be analyzed has decayed to zero before the beam starts back towards its starting point along the time axis. The indicating beam will, of course, be deflected in the direction of the measuring axis by the deflection plates 17 in proportion to the voltage across the resistor 14. Since the plates 16 and 17 are arranged to cause deflection in transverse directions, a curve will be drawn on the screen of the cathode ray oscillograph representing the variation with respect to time of the voltage across the resistor 14.

As the source 20 is an alternating-current source, the voltage of the secondary winding 22 will rise to a peak positive value once during each cycle and the action just explained will take place repeatedly. Owing to the fact that discharge tubes, such as that shown at 33, have the characteristic of ionizing or becoming conducting very rapidly and with substantially constant ionization times in response to voltage impulses applied to their control grids, the action of the timing circuit and the surge discharge circuit is synchronized very accurately and the curves produced on the screen of the cathode ray oscillograph by repeated discharges are superimposed upon one another to produce a brilliant image. The standing image retains its form with such constancy that it may be traced or may be photographed by time exposure.

When using the apparatus for the purpose of producing transients having a predetermined wave shape or for the purpose of finding the circuit constants necessary to produce such a wave shape, the circuit constants of the discharge circuit shown in Fig. 1 are adjusted until the desired wave shape is observed on the screen of the oscillograph. Ordinarily, in making such an adjustment, the capacitance of the surge capacitor 11 is fixed at some arbitrary value equal to the impulse generator capacitance, whose discharge circuit constants are being sought after, and the constants of the inductances, resistors, and capacitors in the discharge circuit are adjusted. It will be understood, however, that I am not limited to the particular arrangement of the inductor 12, resistors 13 and 14, and the capcitor 47 shown in Fig. 1.

When using my analyzer to make a graphical analysis of the surge mechanism of an electrical apparatus, the apparatus to be analyzed or tested is connected to the surge discharge circuit in such a manner as to be subjected to an impulse having the desired wave shape. For example, various kinds of apparatus, such as transformers, machine windings, and other networks, may be connected across the condenser 47. The circuit comprising the condenser 11, inductance 12, resistors 13 and 14, and the condenser 47 is adjusted to produce the wave which it is desired to apply to the connected apparatus. The deflection plates 17 may be left connected as shown in Fig. 1 or they may be connected in any part of the apparatus under test to determine the wave shape present at that part. It is, of course, not necessary to employ all the elements of the discharge circuit shown in Fig. 1 or to connect the apparatus to be tested across the condenser 47. The connection employed is whichever one best serves to impress the desired wave upon the tested apparatus.

By way of illustration, I have shown in Fig. 2 an artificial transmission line 61 built up of lumped constants and as much of the apparatus of Fig. 1 as is required to explain the manner in which my analyzer is used to make a graphical analysis of the surge mechanism of the transmission line 61. As is well known, such artificial transmission lines consist of a plurality of inductances 62 connected in series and grounded at a plurality of points through condensers, such as the condensers 63. I have shown the artificial transmission line 61 with several taps, lettered A to H, to enable measuring the voltages at various points in the transmission line. The tap A is at the input end of the line and the tap H is at the output end. A surge impedance 64 may or may not be connected at the output end of the transmission line 61 according to what tests are to be made on the line.

Two commonly used wave shapes employed in surge tests and measurements and easily obtainable by ordinary adjustment of my apparatus are (1 x 5) and (1.5 x 40) waves. This notation in the case of a (1 x 5) wave signifies that it reaches its crest at one microsecond and thereafter falls to half its crest value at five microseconds. Such a wave would accordingly be a relatively fast wave compared with the (1.5 x 40) wave.

Figure 4:
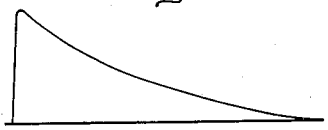

In Figs. 4 to 10, I have shown a number of oscillograms obtained in various tests made on a transmission line, such as the line 61, by the application of a (1.5 x 40) wave. The shape of the wave is shown in Fig. 4, which is the oscillogram obtained when the transmission line is not connected to the discharge circuit. In the oscillograms, vertical distances represent potential difference and horizontal distances represent time. In making the analysis, one of the deflection plates 17 is grounded as in Fig. 1 but the movable terminal 49, connected to the other deflection plate, is moved along to various points in the transmission line 61 to measure the voltage values at such points.

Figure 8:
Figure 5:
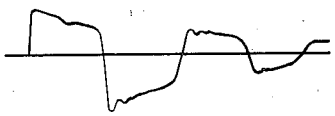
Figure 9:
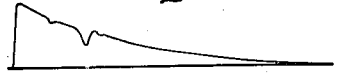
Figure 6:
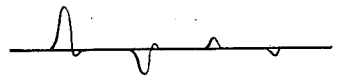
Figure 10:
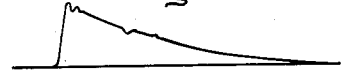
Figure 7:
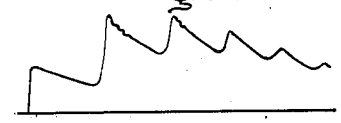

Figs. 5 and 6 represent the wave shapes obtained at taps A and G, respectively, and represent typical current reflections when the line is grounded at one end, that is, with the tap H connected to ground. Figs. 7 and 8 are oscillograms obtained at taps A and H, respectively, when the line 61 is open at one end, and illustrate typical voltage reflections for a transmission line under such conditions. Figs. 9 and 10 are oscillograms obtained at points A and H, respectively, when the surge impedance 64 is connected across the end of the line. As will be understood by those skilled in the art, the surge impedance of the line is equal to the resistance which, connected across the end of the line, consumes completely all the traveling wave energy so that no reflection occurs. The ripples in curves 9 and 10 are due to lumped constant nature of the line tested in contrast to uniformly distributed constants of an actual line.

The apparatus may be used to demonstrate transient phenomena in the lecture room by setting up the desired type of circuit, as shown in Figs. 1 and 2, and demonstrating the wave shapes obtained.

The timing axis may be calibrated; that is, the rate of travel of the beam along the timing axis may be determined by means of a wave meter 65 connected as shown in Fig. 3 wherein only the inductance 12 and the deflection plates 17 of Fig. 1 are shown in order to avoid unnecessary prolixity in the drawings. The wave meter 65 consists of an inductance coil 66 and a variable capacitor 67, both of which are so constructed as to maintain their constants with high precision. The variable capacitor 67 has a movable element to which is connected a pointer 68, co-operating with a scale 69 calibrated in terms of natural frequency of the circuit formed by the condenser 67 and the inductance 66. It will be understood that the capacity of the deflection plates 17 and of the connecting leads must be taken into consideration when the calibration of the scale 69 is made. As wave meters of this type are well known in the art, the manner of calibrating the wave meter need not be described.

In using the wave meter 65 to calibrate the timing axis of my analyzer, the inductance coil 66 of the wave meter is brought into inductive relation with the inductance 12 shown in Fig. 1. The deflection plates 17 are connected directly to the condenser 67 of the wave meter 65 instead of in the manner shown in Fig. 1. The surge-generating apparatus is set in operation and the current impulses in the inductance 12 will induce oscillations in the circuit of the wave meter 65. The coupling between the inductances 12 and 63, however, is preferably relatively loose so that the wave meter 62 will be free to oscillate at the natural frequency corresponding to the inductance 63 and the capacitance of the capacitor 64 at the position where it is set. A damped wave train corresponding to this natural frequency of vibration will then appear on the screen of the oscillograph. Since the wave meter 62 has been calibrated in terms of frequency, the time period represented by each oscillation in the wave train can be determined and this provides the calibration for the timing axis of my analyzer.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In combination, a cathode ray oscillograph having timing axis plates and deflection plates, a surge capacitor, a timing-circuit condenser, means for charging said capacitor and said condenser, means for discharging said capacitor and said condenser, means for synchronizing the discharge of said capacitor with the charging of said condenser, and means in the discharge circuit of said capacitor connected to said deflection plates to deflect the cathode ray beam in accordance with the instantaneous values of the surge produced by discharge of said surge capacitor, said timing axis plates being connected to said timing-circuit condenser for the purpose of sweeping said cathode ray beam back and forth along the timing axis.

2. In combination, a surge capacitor, a discharge circuit therefor, a valve interposed in said discharge circuit, an oscillograph producing an indicating beam having means associated with said discharge circuit for deflecting the beam along a deflection axis and having means for periodically deflecting the beam along a timing axis transverse to the deflection axis, and means for tripping said valve each time said beam is swept along the timing axis.

3. In combination, an oscillograph producing an indicating beam and having means for deflecting its beam along a deflection axis and for sweeping the beam along a timing axis, a timing-circuit condenser associated with said beam-sweeping means, a surge capacitor and a discharge circuit therefor associated with said deflecting means, a source of current fluctuating in voltage, means for charging said timing-circuit condenser from said source whenever the voltage exceeds a predetermined value to sweep the beam forward along its timing axis, a valve in series with the discharge circuit of said surge capacitor, means for tripping said valve to initiate a surge in said discharge circuit whenever said timing-circuit condenser is being charged, and means for discharging said timing-circuit condenser to return the beam to its starting point along the timing axis.

4. A transient demonstrator comprising in combination, a surge generator, a circuit of predetermined electrical characteristics connected to said surge generator, an oscillograph producing a beam with means for deflecting the beam along transverse axes in accordance with a measured quantity and in accordance with time, said measuring axis deflecting means being connected to points in said circuit, means for synchronizing the generation of surges with the deflection of the beam back and forth along the timing axis, whereby a stationary image representing the magnitude of the surge is produced by said oscillograph.

5. In a transient analyzer including an oscillograph with a deflecting indicating beam, the combination of means for advancing said beam at a predetermined rate and returning the beam at a slower rate, means controlled by said beam-operating means for releasing transient phenomena to be observed, and means for accurately synchronizing the release of said transient phenomena with the motion of said beam.

6. A transient analyzer comprising in combination, a source of alternating current, an oscillograph having a deflecting indicating beam, means for advancing said beam at a predetermined rate once for each cycle of said alternating current, means for returning said beam, means for releasing transient phenomena to be observed once for each cycle of said alternating current, and means for accurately synchronizing the release of said transient phenomena with the initiation of the timing motion of said beam.

7. In combination, a source of alternating current, a surge capacitor, means for causing said capacitor to be charged from said alternating-current source during negative half cycles thereof, an oscillograph having a deflecting indicating beam, means for initiating the forward motion of said beam whenever the voltage of said alternating current reaches a predetermined positive value, means for simultaneously initiating a surge discharge from said surge capacitor, and means for returning said beam after a time period sufficient to permit decay of said surge to zero value.

8. In a transient analyzer including an oscillograph with an indicating beam adapted to be deflected along transverse axes, the combination of means for releasing transient phenomena to be observed, and means for deflecting said beam along one axis in accordance with the instantaneous magnitude of the transient, means for advancing said beam along the other axis at a predetermined time rate such that the period of travel in one direction is greater than the period within which transients decay to zero value, and means for returning the beam after it has fallen to zero in the direction of the first named axis, whereby a zero line is drawn by said beam, said transient-releasing means being controlled by said beam-advancing means.

9. A device for visually demonstrating transmission line phenomena comprising in combination, an oscillograph having an indicating beam adapted to be deflected along a pair of transverse axes, a surge generator, an artificial transmission line connected to said surge generator, means for advancing said beam at a predetermined rate along a timing axis, means for initiating surges in said surge generator when the motion of said beam along the timing axis is initiated, means for returning the beam along the timing axis, and means for deflecting the beam along a transverse axis in proportion to the magnitude of voltage existing in a part of said artificial transmission line.

10. In a graphic analyzer including an oscillograph with an indicating beam adapted to be deflected along a pair of transverse axes and a surge generator including an inductive circuit, a method of calibrating the timing axis of said oscillograph which comprises bringing a wave meter into inductive relation with the circuit of said surge generator, connecting said wave meter to means for deflecting said beam along an axis transverse to its timing axis, causing a surge to be produced by said surge generator, and observing the period of the wave train produced by said wave meter and recorded by said beam.

11. Apparatus for calibrating the timing axis of a graphic analyzer including an oscillograph producing an indicating beam adapted to be deflected along transverse axes, a surge generator having an inductance in circuit therewith, means for sweeping said beam along a timing axis, and means for synchronizing the operation of said surge generator circuit and associated with the calibrating apparatus comprises a wave meter in inductive relation with the inductance in said surge generator circuit and associated with the means for deflecting said beam along a transverse axis, whereby the operation of said surge generator sets up oscillations in said wave meter and transverse oscillations of the oscillograph beam having the natural frequency of said wave meter.

12. A graphical transient analyzer comprising in combination, an oscillograph producing a beam deflectible along transverse axes, a timing circuit for said oscillograph including a condenser, a surge capacitor, means for charging said condenser and said capacitor, a valve interposed between said charging means and said condenser and adjusted to conduct current to said timing condenser from its charging means only after its charging means has attained a predetermined voltage, a discharge circuit for said surge capacitor including a discharge tube having a control electrode, means for coupling said control electrode to the charging circuit of said timing condenser, whereby the potential of said control electrode is raised to make said discharge tube conducting and to initiate the discharge of said surge capacitor whenever charging current is initiated in said condenser, and means for deflecting the beam of said oscillograph along an axis transverse to said timing axis in response to an effect of the discharge produced by said surge capacitor.

13. In combination, a surge capacitor, a discharge circuit therefor, a valve interposed in said discharge circuit and adapted to pass current in a given direction, an oscillograph producing an indicating beam having means associated with said discharge circuit for deflecting the beam along a deflecting axis and having means for periodically deflecting the beam along a timing axis transverse to the deflecting axis, means for tripping the valve each time said beam is swept along the timing axis, and a rectifier so connected across said valve as to pass current flowing in the direction opposite to the current passed by said valve.

NICHOLAS ROHATS.